United States Patent
Coates et al.

(10) Patent No.: US 9,371,486 B2
(45) Date of Patent: Jun. 21, 2016

(54) METHOD AND APPARATUS FOR MAXIMIZING THROUGHPUT OF INDIRECTLY HEATED ROTARY KILNS

(75) Inventors: Ralph L. Coates, Salt Lake City, UT (US); L. Douglas Smoot, Provo, UT (US); Kent E. Hatfield, Salt Lake City, UT (US)

(73) Assignee: COATES ENGINEERING, LLC, Salt Lake City, UT (US)

( * ) Notice: Subject to any disclaimer, the term of this patent is extended or adjusted under 35 U.S.C. 154(b) by 183 days.

(21) Appl. No.: 13/565,664

(22) Filed: Aug. 2, 2012

(65) Prior Publication Data

US 2012/0292232 A1 Nov. 22, 2012

Related U.S. Application Data

(63) Continuation of application No. 12/470,423, filed on May 21, 2009, now Pat. No. 8,298,406.

(51) Int. Cl.
| | |
|---|---|
| C10B 47/18 | (2006.01) |
| C10B 47/30 | (2006.01) |
| C10B 1/10 | (2006.01) |
| C10B 53/06 | (2006.01) |
| F27B 7/08 | (2006.01) |
| F27B 7/32 | (2006.01) |
| F27B 7/33 | (2006.01) |

(52) U.S. Cl.
CPC . *C10B 47/30* (2013.01); *C10B 1/10* (2013.01); *C10B 53/06* (2013.01); *F27B 7/08* (2013.01); *F27B 7/3205* (2013.01); *F27B 7/33* (2013.01); *Y02P 20/145* (2015.11)

(58) Field of Classification Search
CPC .................................. C10B 47/18; C10B 47/30
See application file for complete search history.

(56) References Cited

U.S. PATENT DOCUMENTS

| | | | | |
|---|---|---|---|---|
| 2,441,386 | A * | 5/1948 | Berg .................... | C10G 1/02 202/131 |
| 2,723,226 | A | 11/1955 | Lesher | |
| 4,116,810 | A | 9/1978 | Jones et al. | |
| 4,181,491 | A | 1/1980 | Hovis | |
| 4,218,304 | A | 8/1980 | Styring | |
| 4,425,220 | A * | 1/1984 | Kestner, Jr. ................... | 208/407 |
| 4,439,209 | A | 3/1984 | Wilwerding et al. | |
| 5,068,010 | A | 11/1991 | Mundstock et al. | |
| 5,254,139 | A * | 10/1993 | Adams ............................ | 44/626 |
| 5,308,596 | A | 5/1994 | Kotzian et al. | |
| 5,312,599 | A | 5/1994 | Schwartz | |
| 5,393,225 | A | 2/1995 | Frieberger et al. | |
| 5,662,052 | A | 9/1997 | McIntosh et al. | |
| 5,728,271 | A | 3/1998 | Piskorz et al. | |
| 5,961,786 | A | 10/1999 | Freel et al. | |
| 5,997,288 | A * | 12/1999 | Adams ..................... | C10B 1/10 202/131 |
| 6,485,841 | B1 | 11/2002 | Freel et al. | |
| 7,101,463 | B1 | 9/2006 | Weinecke et al. | |
| 2009/0139851 | A1 | 6/2009 | Freel | |
| 2009/0266380 | A1 | 10/2009 | Freel et al. | |
| 2010/0294700 | A1 | 11/2010 | Coates et al. | |

FOREIGN PATENT DOCUMENTS

| | | |
|---|---|---|
| WO | WO 2009/062528 | 5/2009 |
| WO | WO 2009062528 A1 * | 5/2009 |

\* cited by examiner

*Primary Examiner* — Randy Boyer
(74) *Attorney, Agent, or Firm* — Pate Peterson PLLC; Brett Peterson

(57) ABSTRACT

An apparatus and method for achieving improved throughput capacity of indirectly heated rotary kilns used to produce pyrolysis products such as shale oils or coal oils that are susceptible to decomposition by high kiln wall temperatures is disclosed. High throughput is achieved by firing the kiln such that optimum wall temperatures are maintained beginning at the point where the materials enter the heating section of the kiln and extending to the point where the materials leave the heated section. Multiple high velocity burners are arranged such that combustion products directly impact on the area of the kiln wall covered internally by the solid material being heated. Firing rates for the burners are controlled to maintain optimum wall temperatures.

20 Claims, 13 Drawing Sheets

FIGURE 14

Input Data - Oil Shale Properties
    Density, kg/m³      90
    Heat capacity, J/kg C      1,600
    Conductivity, W/m C      1.04
    Inlet temperature, C      38
    Pyrolysis reaction rate,
        % per min = $A \, e^{(-B/T_K)}$
        A = 4.78E+15
        B = 2.7E+4
        $T_K$ = temperature, Kelvin Input Data - Kiln Properties
    Diameter, meters      3.66
    Length, meters      44
    Rotation, rpm      1.44
    Slope, degrees      1.10
    Fill angle, radians      1.50
    Fraction filled      0.08
    Kiln internal surface area covered, m²      120
    Kiln internal surface area total, m²      505
    Kiln wall temperature, C      550
Computed mass flow, tonnes/hr      38

Heat transfer computations, Chem. Eng. Handbook, 6th Edition
    Typical range of HT coefficients, W/m²C
        Low temperatures (200 C)      17
        High temperatures (1100 C)      85
    Assumed HT coefficient, W/m²C      45
    Assumed oil shale outlet temp, C      500
    Temp difference in      512
    Temp difference out      50
    Temp difference log mean      199
    Computed total heat input, KW      4,544

Model computation results
    Kiln throughput, tonnes per day      903
    Oil shale outlet temperature, C      500
    Fraction oil shale pyrolysed      1.00
    Total heat input, KW      8,862
    Effective overall heat transfer coefficient,
        W/m²C      88

FIGURE 15

| Kiln properties | | Material properties | rock | quartz |
|---|---|---|---|---|
| Inside diameter, m | 0.25 | Density, kg/m$^3$ | 1400 | 1400 |
| Heated length, m | 2.13 | Heat capacity, J/kg C | 600 | 1600 |
| Internal surface area, m$^2$ | 1.70 | Conductivity, W/m C | 1.0 | 1.0 |
| Rotation, rpm | 8 - 17 | Particle size, mm | 5.0 | 0.4 |

| Material | Feed rate kg/min | Kiln wall Ave temp, C | Material temperatures Inlet, C | Material temperatures Outlet, C | Heat input KW |
|---|---|---|---|---|---|
| rock | 1.8 | 590 | 25 | 555 | 26 |
| rock | 3.4 | 583 | 25 | 446 | 38 |
| quartz | 1.8 | 590 | 25 | 555 | 25 |
| quartz | 3.3 | 624 | 25 | 549 | 46 |

METHOD AND APPARATUS FOR MAXIMIZING THROUGHPUT OF INDIRECTLY HEATED ROTARY KILNS

The present application is a continuation application of U.S. patent application Ser. No. 12/470,423, filed May 21, 2009, now issued as U.S. Pat. No. 8,298,406, which is incorporated herein by reference in its entirety.

CONTRACTUAL ORIGIN OF THE INVENTION

The United States Government has rights in this invention pursuant to Grant De-FG02-08ER84951 provided by the U.S. Department of Energy to Combustion Research, Inc., a predecessor company of CRE Energy, Inc.

This invention was made with U.S. Government support under Contract No. FR-FG02-08ER84951 awarded by the Department of Energy. The government has certain rights in the invention.

BACKGROUND OF THE INVENTION

1. Technical Field

This invention relates to an apparatus and method for heating materials as part of a chemical process. More specifically, the invention is directed to kilns adapted for producing end or intermediate products by heating initial materials without direct contact of the initial materials by combustion products.

2. Statement of the Art

Structures and methods for controlled heating of initial process materials for purposes of producing intermediate or end products are well known. Such structures, whether of a static-type construction or alternatively of a dynamic construction, have been described in the literature. Fischer described both vertical shaft retorts and rotary kiln retorts and rotary kiln retorts that were operated in Germany prior to 1925. Phumpherton vertical retorts were operated in Scotland during the time period of 1894 to 1938. In Estonia, Davidson type rotary kilns were successfully operated from 1931 to 1961. In each of these instances, the use of these kilns was subsequently abandoned in view of low throughput rates, i.e., routineers were unable to achieve sufficiently high material throughput rates to meet desired production rates.

Tosco rotary retorts, developed in the U.S. prior to 1980, were indirectly heated by cycling hot alumina balls through a horizontal rotary pyrolysis reactor. The balls were directly heated in an external combustor. Galoter retorts, which have operated commercially in Estonia since 1963, employ a rotary reactor and a heating procedure similar to the Tosco retorts except spent shale is combusted and heated in an external fluidized bed and recycled through a horizontal rotary reactor. The heating procedure of the more recent ATP design is similar to the Galoter design except the pyrolysis reactor and shale combustor are connected by an extension of the cylindrical walls of the rotary pyrolysis reactor. All of these retort designs are directed to processing fine particles.

Oil producing pyrolysis reactions of coal, oil shales or other hydrocarbon materials typically occur when they are heated to temperatures of 400° C. to 500° C. Oil yields can be reduced by overheating the solid materials or the pyrolysis vapors. In a 1925 publication Franz Fischer indicated that in order to produce oil by the carbonization of coal, peat or oil shale, it is necessary to reach the decomposition temperature (400° C. to 500° C.) of all the constituents capable of forming oils. Fischer determined that it was advantageous not to raise the temperature beyond that absolutely required, so as to avoid any secondary superheating of the oil vapors, and even to cool the vapors as rapidly as possible below 300° C. He further posited that prolonged heating to higher temperatures would lead to the decomposition of valuable constituents with formation of gas and a consequent diminution of the oil yield.

A further description of the importance of temperature control is provided in U.S. Pat. No. 4,116,810, issued in 1978 and entitled "Indirect Heating Pyrolysis of Oil Shale." The '810 patent teaches that a temperature on the order of slightly over 900° F. (482° C.) is necessary to convert the organic material of the rock to oil. As the temperature of pyrolysis increases, however, considerable differences may occur in the shale oil. For economic considerations, however, it would appear to be desirable to maintain pyrolysis temperature as low as necessary to produce oil and to convert substantially all of the organic material to oil. The lower temperature, also, reduces the inorganic carbonate degradation.

Further disclosure of alternative kiln constructions are disclosed in U.S. Pat. No. 5,068,010; U.S. Pat. No. 5,662,052; U.S. Pat. No. 2,723,226; U.S. Pat. No. 4,439,209; U.S. Pat. No. 5,312,599; U.S. Pat. No. 5,308,596; U.S. Pat. No. 5,393,225 and U.S. Pat. No. 4,181,491.

SUMMARY OF THE INVENTION

The instant invention is directed to an indirectly heated rotary reactor which is constructed to maximize throughput while minimizing the likelihood of undesirable decomposition of the materials being processed due to excessive temperatures within the reactor vessel. Although the invention will be described for use in producing tar and oils by controlled heating of coals and oil shales without direct contact by combustion products, it should be understood that the invention may also be employed for processing other initial materials to achieve various other processes and reactions.

The invention provides a rotary kiln structure which is constructed to heat that portion of a reactor wall which is proximate to materials contained within the reactor vessel. More specifically, as the reactor vessel is rotated during its operation, the material residing within the vessel, which is intended to be processed by the kiln, tends to gravitate to a predictable area of the vessel interior. The instant invention is adapted to concentrate the application of heat to the exterior of the reactor wall of the vessel which corresponds to the area where the material has gravitated. By applying heat directly to that portion of the reactor vessel wall whose interior wall surface is in contact with the material being processed, the invention optimizes the effect of the heat application to the vessel thereby conserving energy and enhancing the heat transfer from an exterior heat source to the material being processed.

During the initial processing of the material, that material is physically transferred from the kiln entry point to a kiln exit point. In a preferred construction, the displacement of the initial material through the kiln results principally from a rotary motion imparted to the kiln. The outlet of the kiln may be positioned elevationally lower than the inlet so that material in the kiln proximate the inlet is urged toward the outlet by the force of gravity. As the kiln is rotated, the material may also be displaced from the entry point to an exit point, by internal structure within the kiln which tends to the urge the initial material through a length of the kiln. Heat is applied to the kiln' exterior wall by a heat source. The exterior wall is heated to a temperature sufficient to raise the temperature of the material within the kiln to a desired temperature. The heat is preferably applied at locations which maintain a selected wall temperature to those portions of the kiln wall that contact the material during the displacement of the material from the entry point to the exit point. Stated otherwise, the kiln is constructed such that upon entry into the kiln, the material is urged into contact with a heated kiln wall having a preselected operational temperature. As the kiln is rotated to effect a displacement of the initial material through a length of the kiln, the material is continuously in contact with a portion of the kiln wall which is being directly heated from the exterior of the kiln to a temperature which is selected to maintain a preselected temperature of the material within the kiln.

The invention provides an apparatus and method to maintain the portion of the kiln wall which contacts the material throughout its displacement through the kiln at selected temperatures. In one embodiment, the kiln wall temperature is maintained at a constant level over the length of the kiln by positioning heat sources, e.g., high velocity burners, spacedly along a length of the kiln. These heat sources are controlled to provide heating, e.g., firing, rates which are calculated to maintain the internal kiln wall at the pre-selected optimum temperature. In alternative embodiments, the heat sources are selectively controlled to directly heat that portion of the kiln wall which is physically covered, i.e., in contact with the initial material so as to achieve various temperatures of the material at various locations along the length of the kiln. This selective placement of the heat sources operates to optimize the heat transfer to the initial material while also providing a means of maintaining the pre-selected wall temperature of the kiln.

In a further preferred embodiment directed specifically to rotary kilns, the invention recognizes that due to the rotary motion of the kiln, the initial material will tend to follow a likely position within the cross section of the kiln during its displacement through the length of the kiln from entry point to exit point. The invention anticipates a means to calculate that likely cross sectional initial material position for each vertical cross section of the kiln over the length of the kiln.

The invention then provides a means of utilizing the data as to the likely cross sectional initial material positions for purposes of positioning the heat sources so as to maximize the heat transfer from those heat sources through the kiln wall to the initial material. In one preferred construction, a number of selected vertical cross sections of the kiln are identified. For each cross section, the projected location of the bed of material within the kiln is determined. The location of the center of mass of the bed of material for each location is then identified. The location of the center mass is determined by taking into consideration the likely location of the material within the rotating kiln at the location in the kiln corresponding to the specific cross section during a rotational operation of the kiln. The center of volume of the cross section of the interior of the kiln reactor vessel is then determined. A linear radius is then defined which extends from the center point through the center of mass thereafter intersecting the kiln wall. This linear radius is then used as a means of positioning the placement of the heat source. A longitudinal axis is determined for a heat source to be utilized in the invention. In most instances, a heat source having an open flame is used and the longitudinal axis for such a heat source is typically defined as a longitudinal axis associated with the flame itself.

Subsequently, for each selected cross section of the kiln, a heat source for that location is positioned pursuant to one of a number of possible orientations. In a first embodiment, the heat source is positioned such that the longitudinal axis of the heat source intersects the center of mass of the material being processed. The heat source is typically positioned such that the flame of the heat source is directed toward the exterior reactor vessel wall or is positioned closely proximate thereto.

In one construction, the longitudinal axis of the heat source is positioned co-linear with the linear radius associated with the cross section. In other embodiments, the longitudinal axis may be positioned at an angle to the linear radius. In preferred constructions, this angle may vary between approximately positive sixty degrees and a negative sixty degrees.

In another embodiment, the longitudinal axis of the heat source may be oriented so that it intersects the center of volume of the cross section of the interior of the kiln. In alternative embodiments of this particular embodiment, the longitudinal axis of the heat source may be oriented at an angle to the linear radius of the kiln. This particular angle may vary between a positive forty degrees and a negative forty degrees.

In yet a further embodiment of the invention, the heat source may oriented such that the longitudinal axis of the heat source intersects the kiln wall at the location where the linear radius of the kiln cross section intersects the kiln wall.

The invention also contemplates determining the temperature for each of the selected cross sections of the kiln, either by calculations or monitoring. Utilizing the data regarding the temperature of each cross section, the invention contemplates controlling the amount of heat provided to the kiln at that cross section in order to maintain the kiln wall temperature at that cross section location at a pre-selected level. This control of the heat sources may include controlling the firing rate of individual burners which constitute the heat sources. Alternatively, selected groups of heat sources may be controlled in unison to achieved the desired temperature maintenance.

BRIEF DESCRIPTION OF THE DRAWINGS

FIG. 14 is a tabulation of test results from a computer simulation of the operation of a kiln constructed and operated according to the particulars of the invention;

FIG. 15 is tabulation of test results from experimental trials using a laboratory scale version of a kiln according to the instant invention; and

DETAILED DESCRIPTION OF THE ILLUSTRATED EMBODIMENTS

The drawings show preferred embodiments of the invention and illustrate how those embodiments differ from the state of the art. When considered in connection with the following description of the invention, its construction, operation and its advantages should be readily understood and appreciated.

Figure 1:
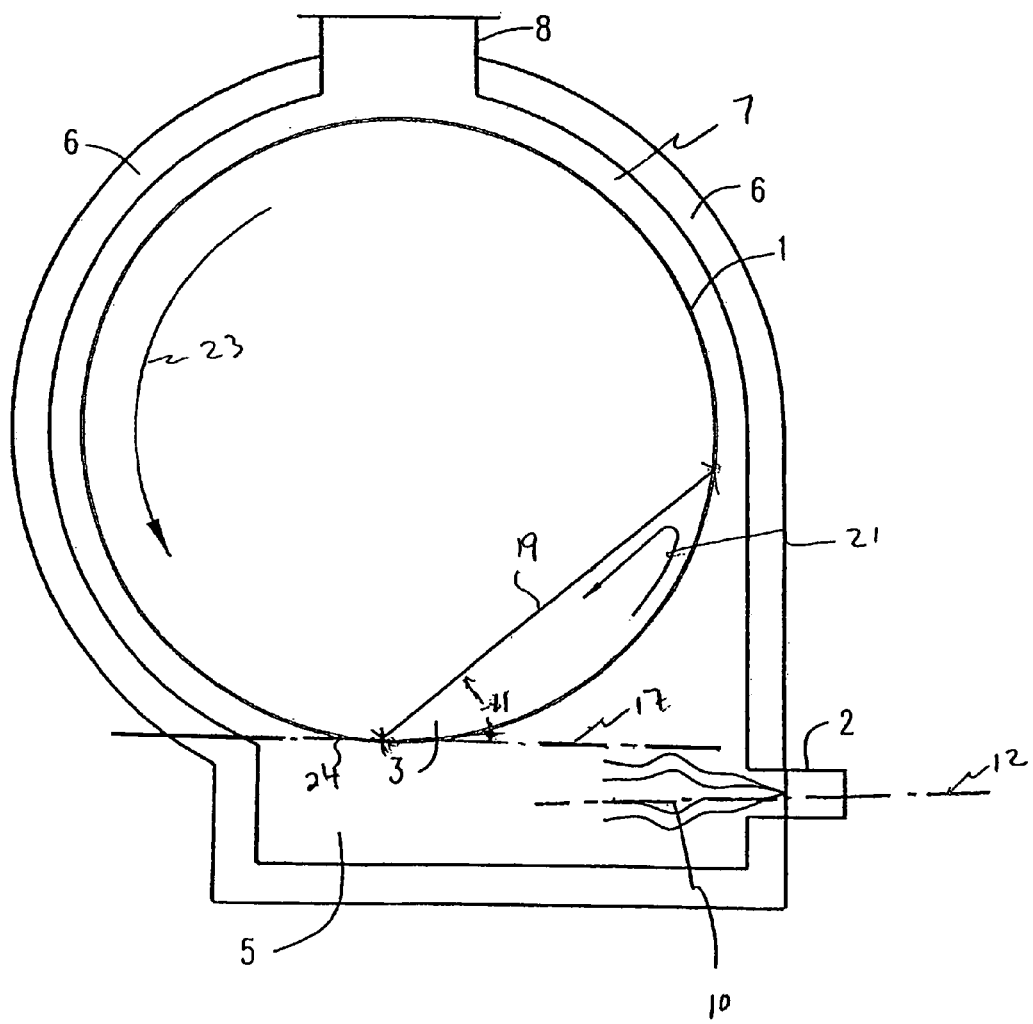
FIG. 1 is a cross sectional view of a conventional rotary kiln of the prior art.

FIG. 1 presents a cross-section of a typical state of the art rotary kiln showing the position of the burners relative to the position of the rotating bed of the solid material that is being heated, the shape of the combustion chamber and flow pathways of the combustion products leaving the combustion chamber. As shown a reactor vessel 1, adapted for rotation in a direction indicated by arrow 23 is shown positioned within a housing 6. The vessel 1 is physically separated from the interior wall of the housing 6 by a passageway 7. The passageway communicates with an exhaust outlet 8 which is positioned in the upper region of the housing 6. The passageway 7 further communicates with a chamber 5 which is positioned near the lower region of the housing 6. Chamber 5 communicates with a heat source 2 which is mounted within the wall of the housing 6. The flame 10 of the heat source defines a longitudinal axis 12. Resident within the interior of the vessel 1 is a quantity of material 3 which is intended to be processed within the kiln. The material 3 defines an angle of repose 11 which is defined as the angle between the horizontal 17 and the upper surface 19 which the material forms as it is rotated within the kiln 1. As shown, the material follows a generally curved path of travel 21 as the kiln is rotated in the direction indicated by arrow 23. In conventional constructions, the longitudinal axis 12 of the flame 10 of the heat source 2 is typically oriented parallel to a tangent line 24 of the lower portion of the kiln. In the illustration, the tangent line 24 is co-linear with the horizontal line 17. In conventional operation, the flame 10 heats the chamber 5, heat is subsequently communicated to the exterior wall of the kiln 1 by convection and radiation from the refractory inner surface of the housing 6. Heated air subsequently passes upward through the passageway 7, thereby surrounding the circumference of the vessel 1, to the exhaust outlet 8 where it is exhausted to the environment.

Figure 2:
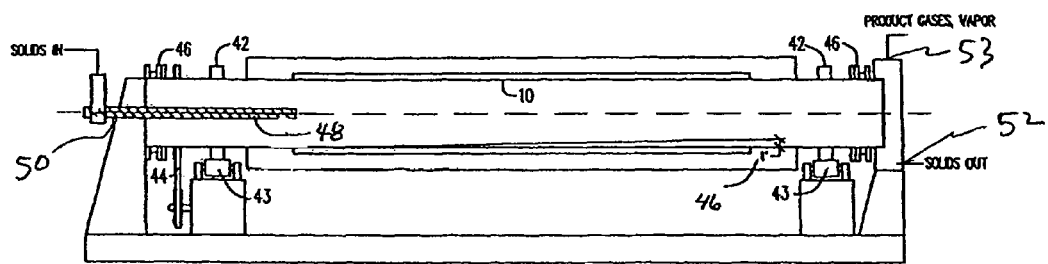
FIG. 2 is a longitudinal cross sectional view of the kiln of the invention, with the heat source being removed for clarity.
Figure 3:
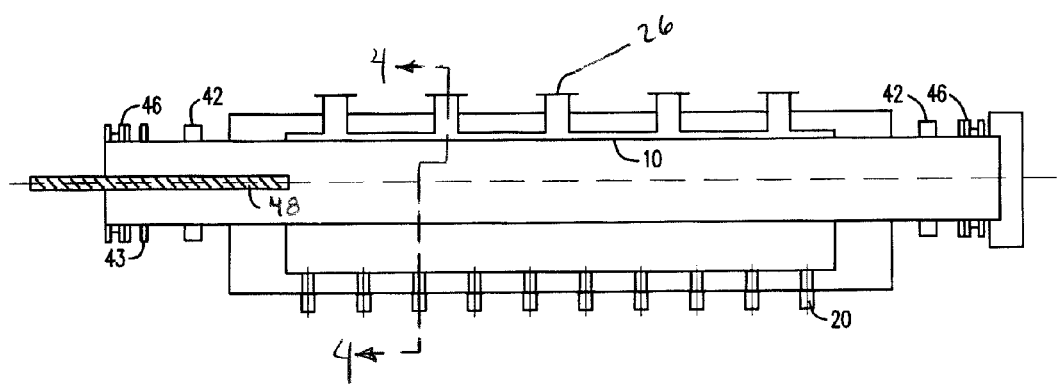
FIG. 3 is a longitudinal cross sectional view of a kiln of the invention of FIG. 2 showing the burner placement along the length of the kiln.

FIG. 2 is an axial section of an embodiment of a kiln according to the instant invention. As shown solid material enters the kiln at an inlet 50 by means of a screw 48 and exits the kiln through an outlet 52. The product gases and vapors, produced during the processing of the material within the kiln are withdrawn from the kiln through exhaust vent 53. The kiln is supported by a tire supporting element 42 which in turn is retained by a roller supporting tire 43. A drive assembly, which includes a drive sprocket 44 operates to rotate the kiln. The kiln is sealed by a sealing structure 46. The kiln is angled to the horizon at an angle 46 so as to urge material in the kiln to traverse the distance between the inlet 50 and the outlet 52. Angle 46 is preferably within the range of 1 to 5 degrees. FIG. 3 presents a second axial section of a kiln according to the invention showing the axial position of the burners and combustion product vent pipes.

Figure 4:
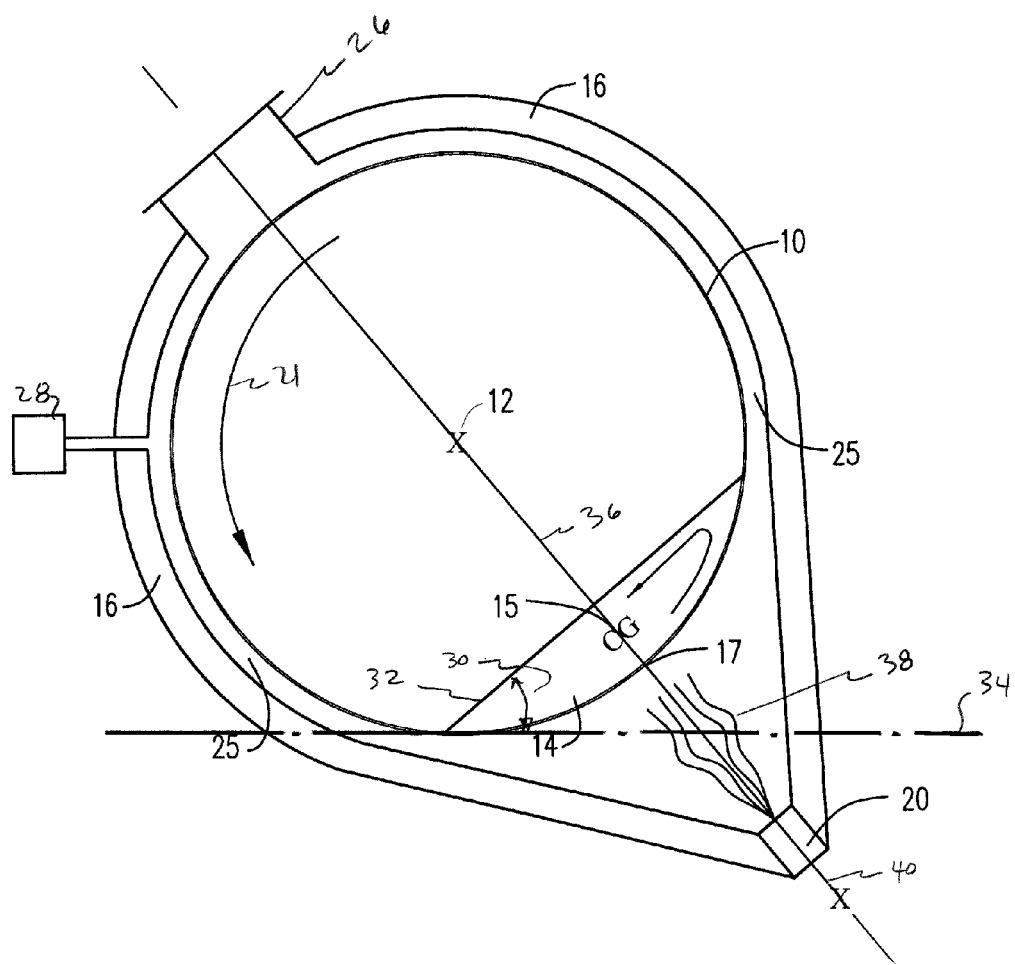
FIG. 4 is a cross sectional view of the kiln according to FIG. 3 taken along section line 4-4 with the burner being shown in an first condition.

In contrast to the cross sectional configuration of a conventional kiln as shown in FIG. 1, FIG. 4 illustrates a cross-section of an embodiment of the kiln of the instant invention. As shown in cross section a kiln 10 is housed within a housing 16. The kiln 10 is physically separated from the housing 6 by a passageway 25. The passageway 25 completely surrounds the kiln 10 and forms a passageway for exhaust gases emanating from the heat source 20 to pass around the circumference of the kiln 10 and thereafter exit the kiln through the exhaust outlet 26. A sensor 28, which is preferably an infrared sensor, is positioned in the wall of the housing 16 for purposes of determining the temperature of the kiln sidewall during the operation of the kiln 10.

As shown, a quantity of material 14 is resident within the interior of the reactor vessel of the kiln 10. The positioning of the material 14 corresponds generally to the orientation that the material 14 would assume during the rotational operation of the kiln as indicated by arrow 21. As shown the material 14 defines an angle of repose 30 which is defined as the angle between the upper surface 32 of the material 14 and the horizontal 34. The angle of repose 30 is determined by the physical constitution of the material 14 together with its particle size as well as moisture content. The interior of the vessel of the kiln 10 defines a center of volume 12. The location of this center of volume 12 is determined by conventional geometric computations. The center of volume 12 is the center of volume of the empty vessel 10 and is therefore computed as if the interior of the vessel were empty.

The mass of material 14 also defines a center of mass 15. The location of the center of mass 15 is also determined by conventional geometric computations taking in to consideration the density of the material. The location of the center of mass 15 may also be determined based on empirical data derived from experiments conducted with regard to the characteristics of the material question and its behavior in a cylindrical kiln subjected to a rotational force. A linear radius 36 is defined as extending from the center of volume 12 through the center of mass 15 and intersecting the exterior wall of the kiln 10 at location 17. This linear radius 36 may also be extended outwardly from the location 17 as shown in FIG. 4 for purposes of locating the burners.

Figure 5:
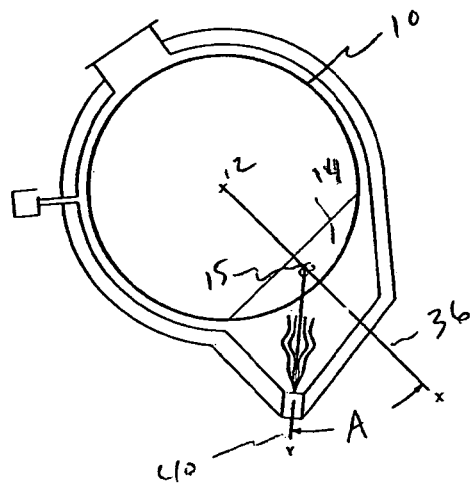
FIG. 5 is a sectional view of the kiln according to FIG. 4 with the burner positioned in an alternative orientation.
Figure 6:
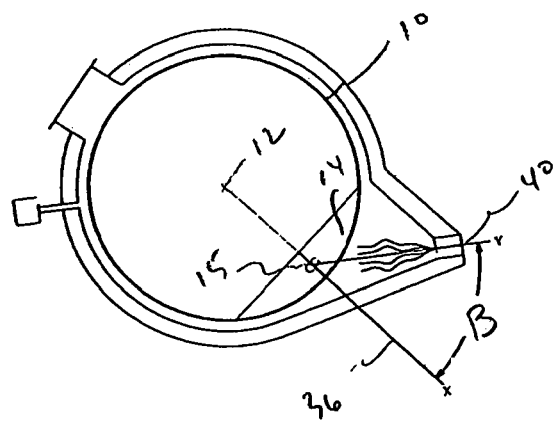
FIG. 6 is a sectional view of a kiln of the invention according to FIG. 4 showing the placement of the burner in an alternative orientation.

In many embodiments of the invention, a burner 20 having an open flame 38 may be utilized as a heat source. The placement of this heat source and hence this burner 20 forms a critical aspect of the invention. As shown the flame 38 of the heat source 20 may be associated with a longitudinal axis 40. The placement of the heat source 20 will be described with reference to the orientation of the longitudinal axis 40. As shown in FIG. 4, the flame 38 may be oriented such that the longitudinal axis 40 passes through the center of mass 15 of the material 14 residing within the vessel 10. In the embodiment illustrated in FIG. 4, the longitudinal axis 40 is also oriented co-linearly with the radius 36 which extends from the center of volume 12 through the center of mass 15. FIG. 4 illustrates one embodiment of the invention wherein the burner is oriented such that the longitudinal axis associated with the flame 38 is positioned so as to pass through the center of mass 15. It should be appreciated that various other orientations of the burner 20 may be obtained by shifting the location of the burner either upwards or downwards while retaining the axis 40 in an orientation such that it passes through the center of mass 15. FIGS. 5 and 6 illustrate alternative constructions wherein the longitudinal axis 40 passes through the center of mass 15 but wherein the longitudinal axis 40 is is not positioned to be co-linear with the radius 36. As shown in FIG. 5, the longitudinal axis 40 may be positioned at a negative angle A from the radius 36. In FIG. 6, the longitudinal axis 40 is shown positioned at a positive angle B from the radius 36. In preferred constructions, angle A is a negative sixty (60) degrees and angle B is a positive sixty (60) degrees. The invention contemplates positioning the longitudinal axis 40 of the flame 38 at any angle to the radius 36 which measures between approximately a negative sixty (60) degrees and a positive sixty (60) degrees while also having the longitudinal axis 40 pass through the center of mass 15 of the material 14 being processed. Preferably, the angle is between approximately a negative twenty 20 degrees and a positive twenty 20 degrees, as measured relative to the radius 36.

Figure 7:
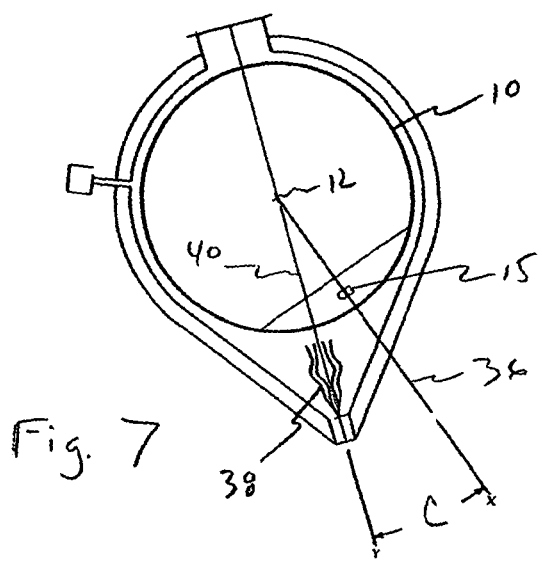
FIG. 7 is a cross sectional view of a kiln of the invention showing the burner placement in a second condition.
Figure 8:
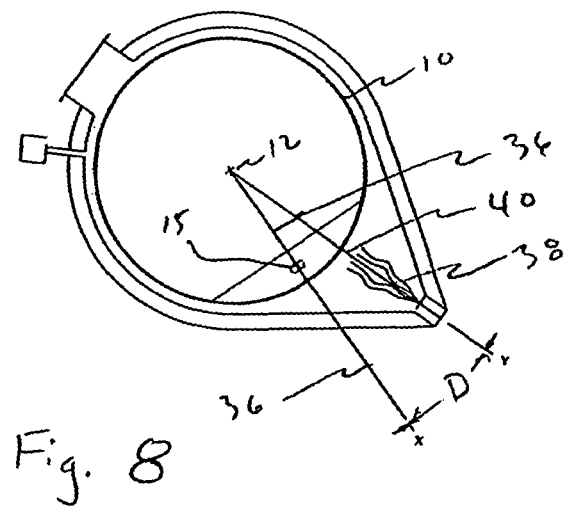
FIG. 8 is a cross sectional view of the kiln of FIG. 7 with the burner being shown in an alternative orientation.

In an alternative embodiment as shown in FIGS. 7 and 8, the longitudinal axis of the flame 38 is oriented to pass through the center of volume 12 of the vessel 10. In this particular embodiment, the longitudinal axis 40 does not necessarily pass through the center of mass 15. As shown in FIG. 7, the flame 38 is oriented such that its longitudinal axis 40 passes through the center of volume 12 while forming an angle C between that longitudinal axis 40 and the radius 36. As may be observed in FIG. 7, the radius 36 passes through the center of mass 15 while the longitudinal axis 40 does not pass through the center of mass 15. Similarly, in FIG. 8, the longitudinal axis 40 is oriented to form an angle D between the longitudinal axis 40 and the radius 36. Here again the radius extends from the center of volume 12 through the center of mass 15, while the longitudinal axis passes through the center of volume 12 but does not pass through the center of mass 15. In this construction, the longitudinal axis 40 of the flame 38 passes through the center of volume 12 and may be oriented at any angle between approximately negative forty (40) degrees and approximately positive forty (40) degrees relative to the linear radius 36. Preferably, this angle is between approximately a negative (20) degrees and a positive (20) degrees relative to the linear radius 36.

Figure 9:
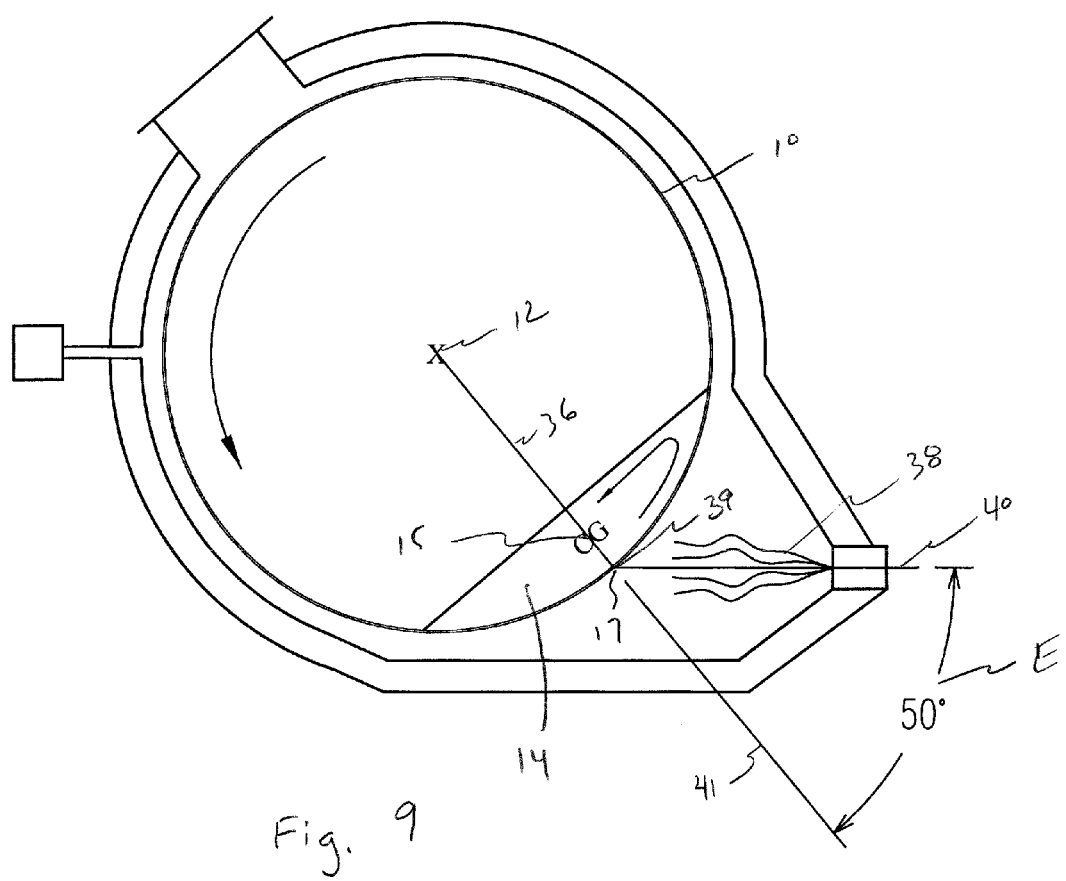
FIG. 9 is a cross sectional view of the kiln with the burner being shown in a further alternative condition.
Figure 10:
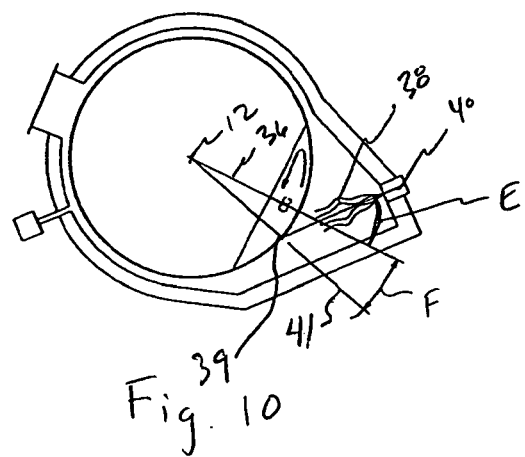
FIG. 10 is a cross sectional view of the kiln of FIG. 9 with the burner being shown in an alternative orientation.
Figure 11:
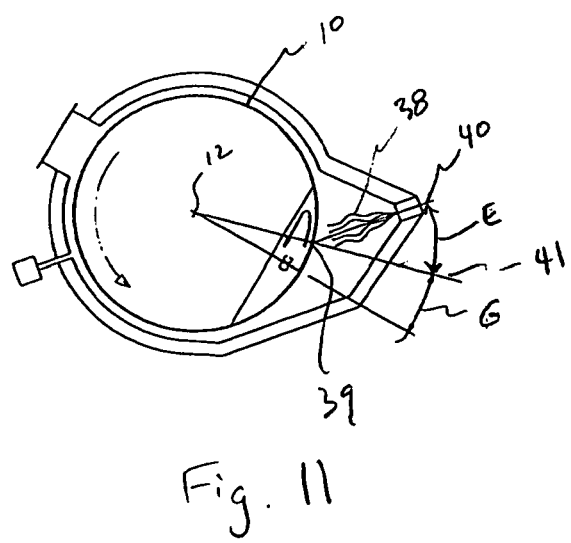
FIG. 11 is a cross sectional view of the kiln of FIG. 9 with the burner being shown in yet a further alternative orientation.
Figure 12:
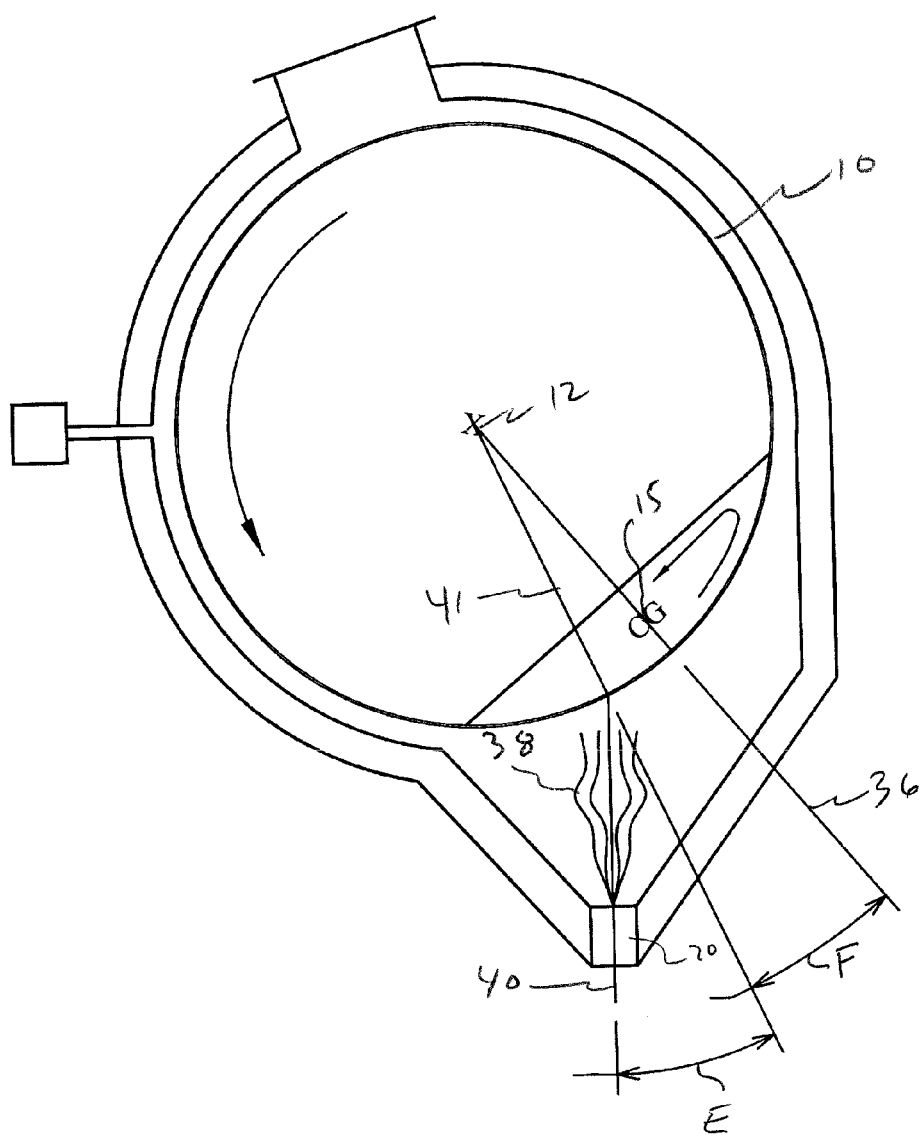
FIG. 12 is a cross sectional view of the kiln of FIG. 9 with the burner being shown in a further alternative orientation.

FIG. 9 illustrates yet a further embodiment of the invention wherein the flame 38 of the burner is oriented such that the longitudinal axis 40 of the flame 38 is oriented such that it intersects the exterior surface of the kiln 10 at the point or location 39. The location of point 39 is determined by the intersection of a radius 41 which extends from the center of volume 12 outwardly and intersects the exterior wall of the kiln vessel 10. In the embodiment shown in FIG. 9 the radius 41 is shown being positioned collinearly with the radius 36, i.e., the point or location 17, i.e., the location where the radius 36 intersects that exterior surface occupies the same location as point 39. In the embodiment shown in FIG. 9, the longitudinal axis 40 is shown being positioned at an angle E relative to the radius 41. As shown the longitudinal axis 40 forms an angle E with the radius 36, which is shown as being 50 degrees in the illustrated embodiment. Angle E is preferably within the range of approximately a positive sixty (60) degrees and a negative sixty (60) degrees. FIGS. 10 and 11 illustrate alternative orientations of this embodiment. As shown in FIG. 10 the radius 41 is shown positioned at a negative angle F from the radius 36. In FIG. 11, the radius 41 is shown positioned at a positive angle F from the radius 36. The angle F may vary between approximately positive forty (40) degrees and approximately negative forty (40) degrees. Preferably, this angle is approximately fifteen (15) degrees. The angle between the radius 41 and the radius 36 may vary between approximately a negative fifty (50) degrees and a positive fifty (50) degrees. Hence, angle G may be between 0 and negative fifty degrees and angle F may be between 0 and positive fifty degrees. FIG. 12 illustrates an embodiment wherein the longitudinal axis of the flame 38 is oriented at an angle E relative to the radius 41. As noted above, the angle E may vary between a positive sixty degrees and a negative sixty degrees with an angle measure between a negative fifty degrees and a positive fifty degrees being preferred.

Figure 13:
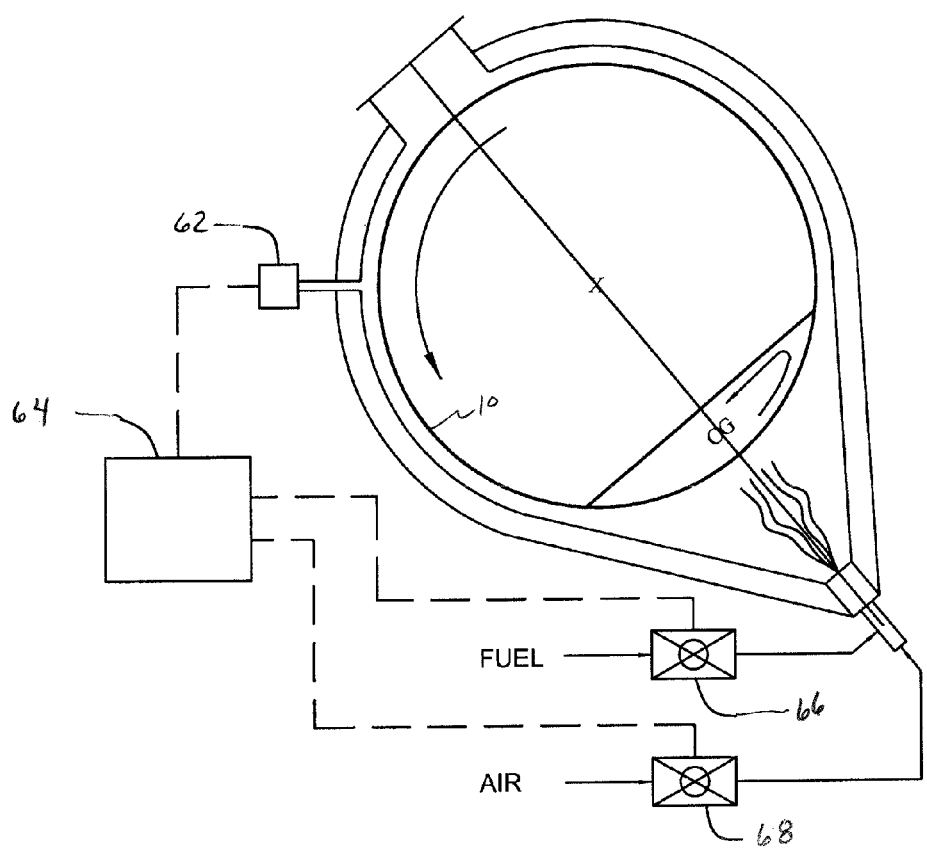
FIG. 13 is a cross sectional view of the kiln of the invention illustrating the temperature control system of the invention.

FIG. 13 presents a cross section of another preferred embodiment of the instant invention showing a control system for adjusting the fuel and air flow rates to the burner 20. These flow rates are varied in order to maintain a specified temperature of that portion of the kiln wall proximate the relevant burner 20. As shown a pyrometer 62 senses the temperature of the wall of kiln 10 and feeds a control signal relaying that information to an microprocessor 64. The microprocessor in turn utilizes the information regarding the temperature to calculate the required adjustments that need to be made in the flow of air and fuel to the burner in order to produce the desired temperature in the kiln wall. The microprocessor then electronically controls the operation of fuel valve 66 and air valve 68 consistent with the calculated adjustments in order to produce the desired temperature in the kiln wall 10.

The inventors developed a detailed computer model of the heat transfer that occurs as solid particles flow through an indirectly heated rotary kiln constructed according to the details of the instant invention. This model treats the kiln as a series of well mixed chemical reactors and simultaneous material and energy balances are computed for these reactors. Extensive computations have shown that conductive heat transfer from the kiln wall to the particles in direct contact with the wall is the dominant mode of heat transfer.

The computer model computations which led to this invention are based on the assumption that the combustion chamber that provides the indirect heat is well-stirred (see H. C. Hottel and A. F. Sarofim, *Radiative Transfer*, McGraw-Hill, 1967, pp. 313, 459) and that the combustion chamber heat sink is that portion of the kiln wall covered by the solid particles being heated. This assumption requires that the covered wall surface area is large relative to any uncovered wall area exposed to heat transfer from the combustion products inside the chamber.

Well-stirred combustor heat transfer equations are used to compute the rate of heat transfer from the combustion products to the covered wall surface. The heat is transferred by conduction through the kiln wall and by convection into the particles in contact with the wall. Because of the relatively high conductivity of the metal wall the temperature differential across the wall is small. Heat transfer rates to the particles in contact with and covering the inner surface of the kiln wall are computed assuming the particles are well-mixed and that the effective convective heat transfer coefficient can be determined from recent correlating equations developed by Li, et al. (Li, S.-Q., Ma, L.-B., Yao, Q., Chemical Engineering Technology, 2005, 28, 1480).

The solid particles are also heated by radiation from the inner surface of the kiln wall that is not covered by the particles and by radiation and convection from the gases inside the kiln. The computer model typically predicts that the rate of heat transfer to the particles by contact convection from the covered wall surface is roughly an order of magnitude greater than the rate of heat transfer from the uncovered wall surface and the gases. This implies that heat transfer from the gases in the combustion chamber to the uncovered kiln wall area is much less efficient than heat transfer from the combustion chamber to the covered wall area. It further implies that combustion chambers enclosed with a minimum of kiln wall surface area that is not in contact with the heated particles, as described in this patent, are more efficient than the combustion chambers of conventional kilns.

FIG. 14 presents a comparison of the results of computations using the computer model with the results of simplified computations following the recommendations published in Perry's Chemical Engineers Handbook, 6$^{th}$ Edition. The results are reflective of a simulated test using oil shale as the material being processed. Assumed properties of the oil shale are presented together with the assumed properties of the kiln.

It was further assumed that shale entered the kiln at a temperature of 38° Celsius (hereinafter, the dimension "Celsius" will be abbreviated as "C"), that it was heated to 500° C. and that the kiln cylinder was uniformly heated to 550° C.

The handbook recommends computing the solid material heating rate using an overall heat transfer coefficient ranging from 17 to 85 W/(m².C) for kiln cylinder temperatures ranging from 200° C. to 1100° C. A coefficient of 45 was selected as appropriate for the 550° C. cylinder temperature. With an overall heat transfer area of 450 square meters and a log mean temperature difference of 199° C., the heat rate is computed to be 4,544 kW.

The kiln model computations resulted in a kiln throughput of 903 tonnes per day, an outlet temperature of 500° C., 100% completion of the pyrolysis reactions and a total heat input of 8862 kW, roughly twice the heat input resulting from the simplified handbook approach. The effective overall heat transfer coefficient was then computed to be 88 W/(m².C).

FIG. 15 presents results of experimental runs with a laboratory scale kiln. This heated cylinder of this kiln has an internal diameter of 0.25 meters, the heated length is 2.13 meters and the internal heat transfer area is 1.7 square meters. It is formed from Inconel and its wall thickness is 13 mm. It can be rotated at rates up to 17 revolutions per minute. It is fired with 6 natural gas burners and it has five vent stacks. Test were made with two inert materials with a narrow particle size distribution, quarry rock with a mean particle size of 5 mm and quartz with a mean particle size of 0.4 mm. Results from four runs are presented, two with each material. Feed rates were 1.8 and 3.3-3.4 kg/minute. Firing rates of burners were controlled to achieve approximately uniform heated section temperatures ranging from 583° C. to 590° C. Temperatures at the outlet of the heating section ranged from 446° C. to 555° C. The computed material heating rates ranged from 26 kW to 46 kW. The overall heat transfer coefficients ranged from 74 to 107 W/(m².C), confirming the high coefficients predicted by the computer model.

Figure 16:
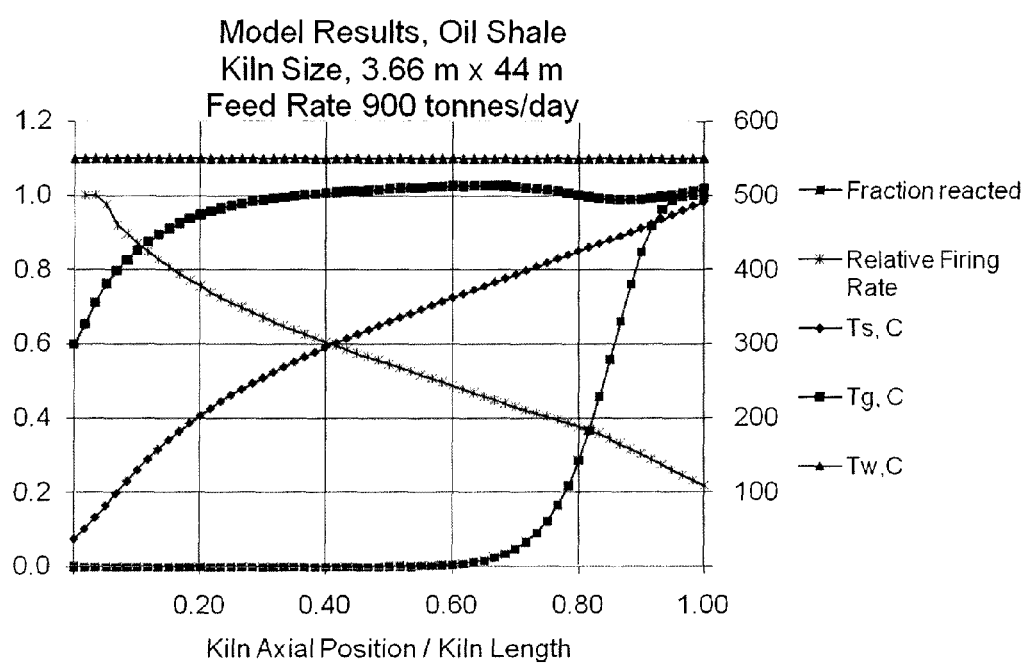

FIG. 16 is a graph of results of computations with the computer model for a commercial scale kiln with an internal diameter of 3.7 meters and heated length of 44 meters. For this run it was assumed that the kiln cylinder was uniformly heated to a temperature of 550° C. This temperature is indicated on the graph as Tw. Oil shale was assumed to enter the kiln at a temperature of 30° C. and its temperature as it progresses through the kiln is indicated by Ts. The progress of the pyrolysis reactions is indicated by Fraction Reacted. It shows that these reactions begin when the oil shale temperature reaches about 360° C. and are completed near the outlet of the heated section. The heating rate required as the shale passes through the kiln divided by the heating rate at the entrance is indicated by Relative Firing Rate. The data show that the heating rate at the outlet is 21% of the heating rate at the inlet. This implies that the firing capacity of the burner located nearest the inlet should be five times the firing capacity of the burner located nearest the outlet. These data points also indicate that multiple temperature sensors should be located along the heated length to supply input data to the control systems that control burner firing rates. It is well known by those skilled in the art that a sweep gas, typically steam, is fed into the kiln to reduce the concentration and residence time of the oil vapor in the kiln, thereby reducing coking reactions of the oil molecules. The data points indicated as Tg represent the temperature of this sweep gas and gas and vapor produced by the pyrolysis reactions.

Applicants have determined from the model computations that the maximum oil yields from pyrolysis in an indirectly heated rotary reactor will occur when the entire heat transfer surface is heated to an optimum temperature near 500° C. Subjecting a proposed model of the instant kiln to computer analysis, computations led to the following corollary conclusions: (1) multiple high velocity burners should be placed along the heated length of the kiln or rotary reactor; (2) because of the computed importance of convective heat transfer, high velocity burners should be utilized and these burners should be positioned such that the burner combustion products impinge on the reactor wall near the center of the rotating bed; (3) the firing rates of the burners should be controlled individually or as groups of a small number of individual burners. The computations also demonstrated that maintaining the kiln wall temperatures near 500° C. requires that the heat flow per square foot of wall area near the particle inlet to be as much as five times greater than the unit heat flow near the particle outlet.

The instant invention also includes a method of making the kiln apparatus disclosed above. More specifically, the method focuses on the method of locating a heat source, e.g., an open flame burner within the body of the kiln apparatus so as to optimize the efficiency of that heat source. As previously discussed FIG. 4 illustrates a cross sectional view of the kiln wherein the heat source is positioned in a first orientation. In this construction the invention provides a means of utilizing the data as to the likely physical location of material within the interior of the kiln during the rotational operation of the kiln as a means of optimizing the location of the heat source. Initially, a selected location along the length of the kiln is identified. Thereafter, the anticipated location of material at that location is determined utilizing conventional dynamics based computational techniques. The projected location of the material within the kiln interior is dependent on the particle size of the material, its viscosity and the speed of rotation of the kiln among other factors. Having determined the particular location and likely shape of the mass of material at the selected location and hence within a cross section of the kiln at the selected location, the routineer then determines the center of mass of the material within the cross section at the selected location. Thereafter, the center of volume of the kiln interior or cross section at the selected location is determined. The routineer then defines a linear radius which extends from the center of volume through the center of mass and which then extends outwardly to intersect the exterior wall of the kiln in the cross section.

The projected location of the material within the kiln interior at a selected location along the length of the kiln is utilized to position the heat source and is used to maximize the heat transfer from that heat source through the kiln wall to the material. In one preferred construction, a number of selected vertical cross sections of the kiln are identified. For each cross section, the projected location of the bed of material within the kiln is determined. The location of the center of mass of the bed of material for each location is then identified. The location of the center mass is determined by taking into consideration the likely location of the material within the rotating kiln at the location in the kiln corresponding to the specific cross section during a rotational operation of the kiln. The center of volume of the cross section of the interior of the kiln reactor vessel is then determined. A linear radius is then defined which extends from the center point through the center of mass thereafter intersecting the kiln wall. This linear radius is then used as a means of positioning the placement of the heat source. A longitudinal axis is determined for a heat source to be utilized in the invention. In most instances, a heat source having an open flame is used and the longitudinal axis for such a heat source is typically defined as a longitudinal axis associated with the flame itself.

Subsequently, for each selected cross section of the kiln, a heat source for that location is positioned pursuant to one of a number of possible orientations. In a first embodiment, the heat source is positioned such that the longitudinal axis of the heat source intersects the center of mass of the material being processed. The heat source is typically positioned such that the flame of the heat source either impinges on the exterior reactor vessel wall or is closely proximate thereto. In a on construction, the longitudinal axis of the heat source is positioned co-linear with the linear radius associated with the cross section. In other embodiments, the longitudinal axis may be positioned at an angle to the linear radius. In preferred constructions, this angle may vary between approximately positive sixty degrees and a negative sixty degrees.

In another embodiment, the longitudinal axis of the heat source may be oriented so that it intersects the center of volume of the cross section of the interior of the kiln. In alternative embodiments of this particular embodiment, the longitudinal axis of the heat source may be oriented at an angle to the linear radius of the kiln as well as intersecting the center of volume. This particular angle may vary between a positive forty degrees and a negative forty degrees.

In yet a further embodiment of the invention, a second radius is defined to extend from the center of volume outwardly to intersect the exterior surface of the kiln wall 10. This second radius forms an angle with the linear radius. This angle is preferably within the range of positive fifteen degrees to a negative fifteen degrees. The burner is positioned such that the longitudinal axis of the flame of the heat source is oriented to pass through the point where the second radius intersects the exterior surface of the kiln wall.

Though the disclosure presents best modes for practicing the invention and an associated manifold system, it is to be understood that numerous variations may be made to the above-disclosed embodiment and still practice the present invention. It is, therefore to be understood that the invention defined by the appended claims is not to be limited by particular details set forth in the above description.

We claim:

1. A method for processing materials comprising:
   selecting a rotary kiln, the rotary kiln having a generally cylindrical kiln body with a cylindrical axis disposed near horizontal, an inlet disposed at a first end of the kiln body, and an outlet disposed at the second end of the kiln body;
   rotating the kiln body about the axis;
   feeding organic material into the kiln inlet such that the rotation of the kiln carries substantially all of the material through the kiln in a single body of matter which is in contact with the kiln body when viewed in cross section, to the kiln outlet, and out of the kiln; and
   directly heating the organic material through the kiln body with a burner flame to decompose the organic material and thereby produce condensable hydrocarbon gasses from the material;
   wherein the burner has an axis which intersects the interior of the kiln body, wherein the burner axis intersects the exterior surface of the kiln body at a location on the kiln body which is in contact with the single body of matter and which is on the bottom half of the kiln body and wherein the surface of the kiln body at said location is ascending due to the rotation of the kiln.

2. The method of claim 1, wherein, when viewed in cross section, the kiln body defines an interior surface all of which is disposed along a generally circular path.

3. The method of claim 1, wherein the burner axis intersects the organic material.

4. The method of claim 1, wherein, when viewed in cross section, the kiln positions substantially all of the organic material in a single continuous body of matter adjacent the bottom of the kiln body and the burner flame contacts the surface of the kiln at a location which is in contact with said single body of matter.

5. The method of claim 1, wherein, when viewed in cross section, said single body of matter defines a center of mass and wherein the burner axis is directed towards the center of mass.

6. The method of claim 1, wherein, when viewed in cross section, the burner axis is directed towards the center of the kiln.

7. A method for processing materials comprising:
   selecting a rotary kiln having a generally cylindrical body having a cylindrical axis disposed near horizontal;
   feeding organic material into a first end of the kiln;
   rotating the kiln body about the cylindrical axis to move the organic material through the kiln such that substantially all of the organic material remains in a single body of matter which is in contact with the kiln body and adjacent the bottom of the kiln body; and
   heating the kiln body to heat the organic material through the kiln body and decompose the organic material with a burner wherein the burner flame defines a central axis and wherein, when the kiln is viewed in cross section, said burner central axis intersects said single body of matter, intersects a location on the kiln body where said location is ascending due to rotation of the kiln, and intersects an interior of the kiln body.

8. The method of claim 7, wherein a burner flame directly contacts the surface of the kiln body.

9. The method of claim 7, wherein the burner central axis intersects a center of mass of the single body of matter.

10. The method of claim 7, wherein the kiln body defines an interior surface which is continuously disposed along a generally circular path.

11. A method for processing materials comprising:
    selecting a rotary kiln having a generally cylindrical body with a cylindrical axis disposed near horizontal;
    feeding organic material into a first end of the kiln;
    rotating the kiln body about the cylindrical axis to move the organic material through the kiln such that substantially all of the organic material remains in a single body of matter which is in contact with the kiln body and disposed adjacent the bottom of the kiln body; and
    directly heating the organic material through the kiln body to decompose the organic material with a burner wherein a burner central axis intersects the interior of the kiln, intersects the single body of matter of organic material, and intersects a location on the kiln body which is in contact with the organic material.

12. The method of claim 11, wherein the burner axis is directed towards a center of mass of the single body of matter.

13. The method of claim 11, wherein the burner axis intersects the kiln body at a location on the kiln body where said location is ascending due to rotation of the kiln.

14. The method of claim 11, wherein the burner axis is directed towards a center of the kiln body.

15. The method of claim 11, wherein a burner flame directly contacts the kiln body.

16. The method of claim 11, wherein the burner central axis is directed upwardly towards the single body of matter in a direction which includes an upward component and a horizontal component.

17. The method of claim 11, wherein the burner central axis is directed in a generally horizontal direction towards the single body of matter.

18. The method of claim 11, wherein the burner central axis is directed towards the single body of organic material in a direction which includes a downward component and a horizontal component.

19. The method of claim 1, wherein the burner axis is directed towards the single body of matter in a direction which includes an upward component and a horizontal component.

20. The method of claim 7, wherein the burner central axis is directed in a generally horizontal direction towards the single body of matter.

* * * * *